United States Patent
Hoshi et al.

[11] Patent Number: 5,911,466
[45] Date of Patent: Jun. 15, 1999

[54] APPARATUS FOR REINFORCING GROUND PRESSURE OF FRONT WHEEL IN MOTORCYCLE

[75] Inventors: Konomu Hoshi; Hiroaki Hasumi; Kenichi Nishimoto; Kouichi Kobayashi, all of Saitama, Japan

[73] Assignee: Honda Giken Kogyo Kabushiki Kaisha, Tokyo, Japan

[21] Appl. No.: 08/812,720

[22] Filed: Mar. 6, 1997

[30] Foreign Application Priority Data

Mar. 6, 1996 [JP] Japan .................................. 8-048547

[51] Int. Cl.$^6$ .................................................. B62D 35/00
[52] U.S. Cl. ...................................... 296/180.1; 296/78.1
[58] Field of Search ........................... 296/180.1, 180.5, 296/78.1; 180/903

[56] References Cited

U.S. PATENT DOCUMENTS

| | | | |
|---|---|---|---|
| 3,695,674 | 10/1972 | Baker | 296/180.1 |
| 3,718,345 | 2/1973 | Bringman | 296/180.5 |
| 3,971,452 | 7/1976 | Morelli | 296/180.1 |
| 4,178,033 | 12/1979 | Muth et al. | 296/78.1 |
| 4,511,170 | 4/1985 | Sankrithi | 296/180.1 |

FOREIGN PATENT DOCUMENTS

| | | | |
|---|---|---|---|
| 3734920 | 3/1989 | Germany | 296/180.1 |
| 556636 | 2/1957 | Italy | 296/180.1 |
| 60-57481 | 4/1985 | Japan . | |
| 404201792 | 7/1992 | Japan | 296/180.1 |
| 1547558 | 6/1979 | United Kingdom | 296/78.1 |

*Primary Examiner*—Dennis H. Pedder

[57] ABSTRACT

Wing portions are used to reinforce ground pressure of a front wheel of a vehicle, such as a motorcycle, in which a center of gravity of the vehicle in a driver riding state is positioned between a front wheel and a rear wheel of the vehicle. The wing portions, each of which is provided in such a manner that an aerodynamic center thereof is positioned forward and downward from the center of gravity of the vehicle, produces down-lift.

20 Claims, 4 Drawing Sheets

APPARATUS FOR REINFORCING GROUND PRESSURE OF FRONT WHEEL IN MOTORCYCLE

BACKGROUND OF THE INVENTION

1. Field of the invention

The present invention relates to an apparatus for reinforcing ground pressure of a front wheel of a vehicle such as a motorcycle, wherein the center of gravity of the vehicle in a driver riding state is positioned between a front wheel and a rear wheel of the vehicle.

2. Description of Background Art

Motorcycles having wing portions for reinforcing ground pressure of a front wheel so as to improve steering characteristics are known, for example, as in Japanese Utility Model Laid-open No. Sho 60-57481.

The above-described conventional motorcycle is so configured that each of the wing portions are provided at a relatively higher position on a cowling covering a front portion of a body frame and thereby an aerodynamic center of the wing portion is positioned forward and upward from the center of gravity of the vehicle in a driver riding state. As a result, a moment around the center of gravity of the vehicle due to down-lift produced by the wing portions acts in the direction of reinforcing ground pressure of the front wheel.

However, the moment around the center of gravity of the vehicle due to drag produced by the wing portions acts in the direction of decreasing the ground pressure of the front wheel. Accordingly, although the wing portion is formed in such a shape as to reduce drag, it must be made larger in size to obtain large down-lift for reinforcing ground pressure of the front wheel.

SUMMARY OF THE INVENTION

In view of the foregoing, an object of the present invention is to provide an apparatus for reinforcing ground pressure of a front wheel of a vehicle such as a motorcycle, the apparatus being capable of reinforcing ground pressure of the front wheel without increasing the size of a wing portion.

In a first embodiment, to achieve the above object, there is provided an apparatus for reinforcing ground pressure of a front wheel of a vehicle such as a motorcycle in which the center of gravity of the vehicle in a driver riding state is positioned between a front wheel and a rear wheel of the vehicle. The apparatus includes wing portions, each of which are disposed in such a manner that respective aerodynamic centers thereof are positioned forward and downward from the center of gravity of the vehicle in a driver riding state, for producing down-lift.

In a further embodiment, in addition to the configuration previously described, each of the wing portions are formed in a shape extending obliquely, downward and outward from a side portion of the vehicle.

In a still further embodiment, in addition to the configuration of the invention previously described, each of the wing portions are formed in a sweep-forward wing shape extending obliquely and forward in the running direction of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
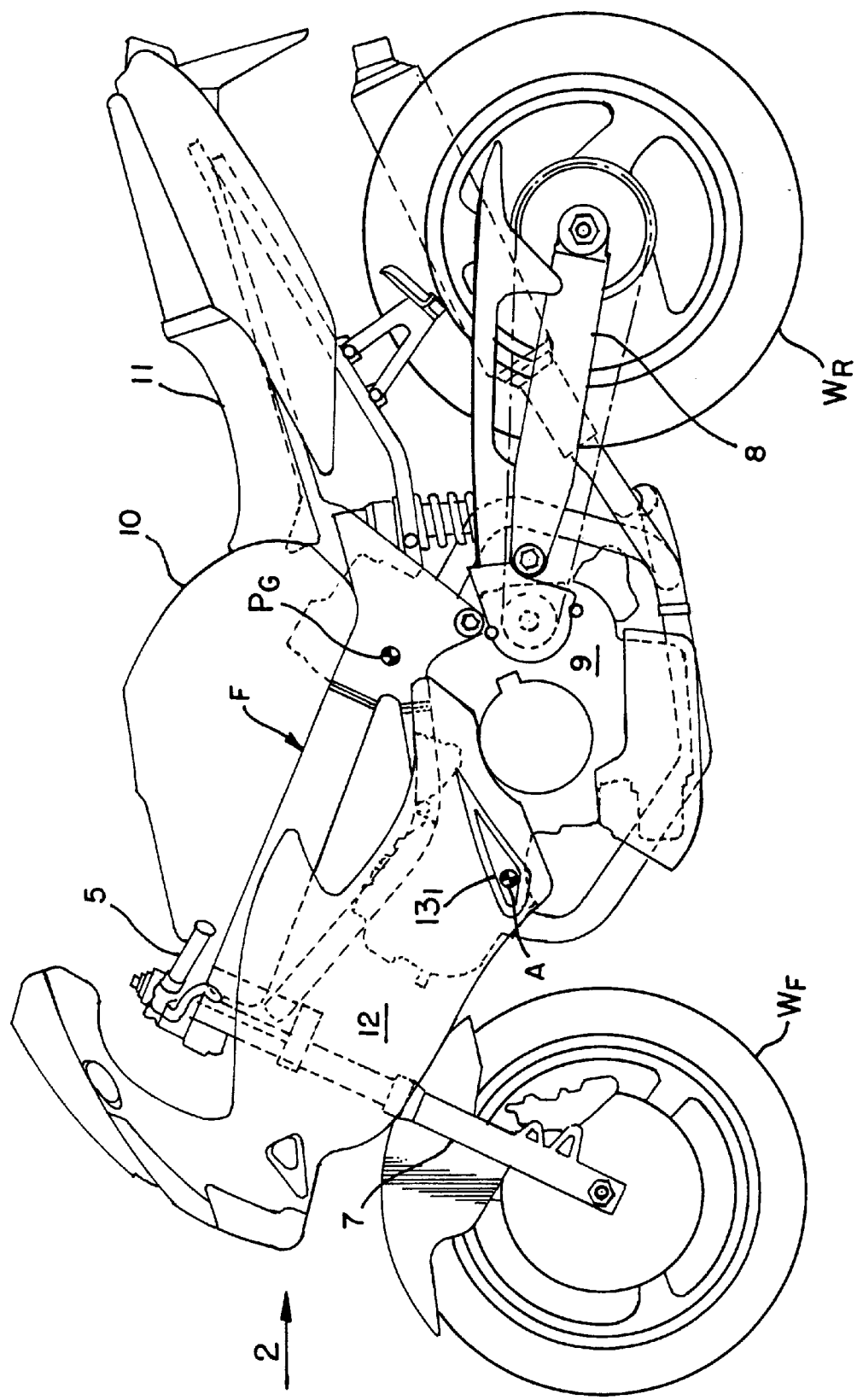
FIG. 1 illustrates a side view of a motorcycle.

Referring first to FIG. 1, a front wheel $W_F$ is suspended from a front portion of a body frame F of a motorcycle through a front fork 7 operable by means of a steering handlebar 5, and a rear wheel $W_R$ is suspended from a rear portion of the body frame F through a rear fork 8. A power unit 9 containing an engine and a transmission is mounted to the body frame F. A fuel tank 10 and a seat 11 are also mounted on the body frame F.

Figure 2:
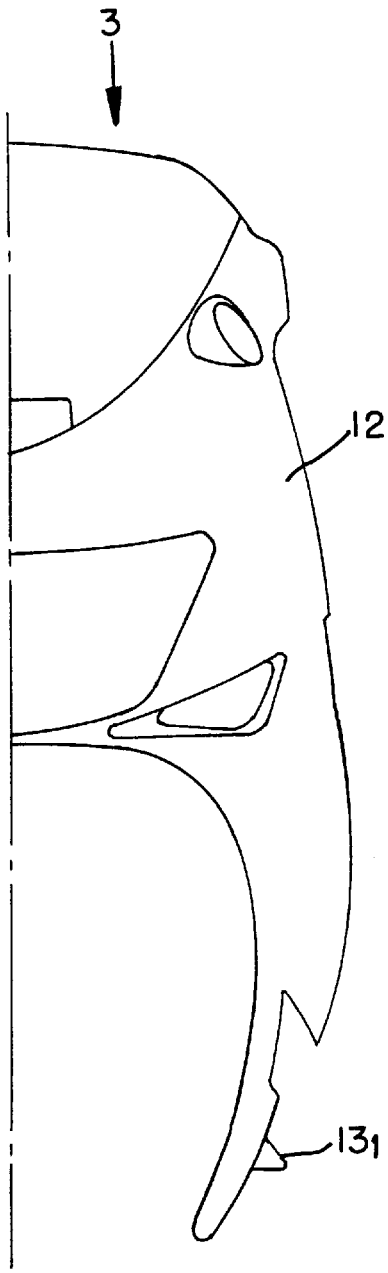
FIG. 2 illustrates a front view in the direction of arrow 2 of FIG. 1, showing a left half cowling of the motorcycle.
Figure 3:
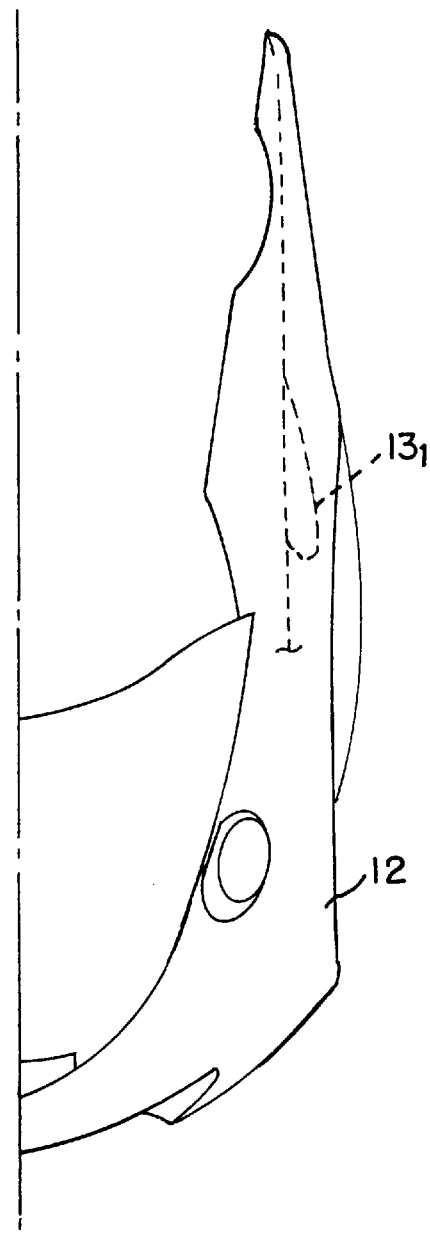
FIG. 3 illustrates a plan view in the direction of arrow 3 of FIG. 2.

Referring to FIGS. 2 and 3, the front portion of the body frame F is covered with a cowling 12. Wing portions $13_1$, $13_1$ for producing down-lift upon running of the motorcycle are respectively provided on outer surfaces of both side portions of the cowling 12.

Incidentally, in the motorcycle shown in FIG. 1, a center of gravity $P_G$ of the vehicle in a driver riding state is positioned between the front wheel $W_F$ and the rear wheel $W_R$. The wing portions $13_1$, $13_1$ are provided on the outer surfaces of both the side portions of the cowling 12 in such a manner as to be positioned forward and downward from the center of gravity $P_G$ of the vehicle.

Each of the wing portions $13_1$, $13_1$ are formed in a sweep forward shape extending obliquely, downward and outward from a side portion of the motorcycle and further extending obliquely and forward in the running direction of the motorcycle.

The function of this embodiment will be described with reference to FIG. 4, in which a thick line indicates an acting direction of lift and a thin line indicates an acting direction of drag.

Lift $F_L$ produced by the wing portion $13_1$ and drag $F_D$ acting on the wing portion $13_1$ produce respective moments in the same direction around the center of gravity $P_G$ of the vehicle. The moments give, to the front wheel $W_F$, a force acting in the direction of reinforcing ground pressure of the front wheel $W_F$. Accordingly, even when the wing portion $13_1$ is relatively small in shape, it can sufficiently reinforce the ground pressure of the front wheel $W_F$ and improve steering characteristics. The reduction in the size of wing portion $13_1$ is also effective to make the drag acting on the wing portion $13_1$ relatively small and to reduce an effect of wind exerted on the wing portion $13_1$ upon turning of the motorcycle.

In this embodiment, the wing portion $13_1$ is formed in a sweep forward shape extending obliquely, downward and outward from the side portion of the motorcycle and further extending obliquely and forward in the running direction of the motorcycle, and consequently an aerodynamic center A of the wing portion $13_1$ as generally illustrated schematically in FIG. 1 can be disposed forward and downward from a base portion of the wing portion $13_1$. This makes it possible to make the above moment around the center of gravity of the vehicle larger, and hence to further reinforce the ground pressure of the front wheel $W_F$.

Figure 4:
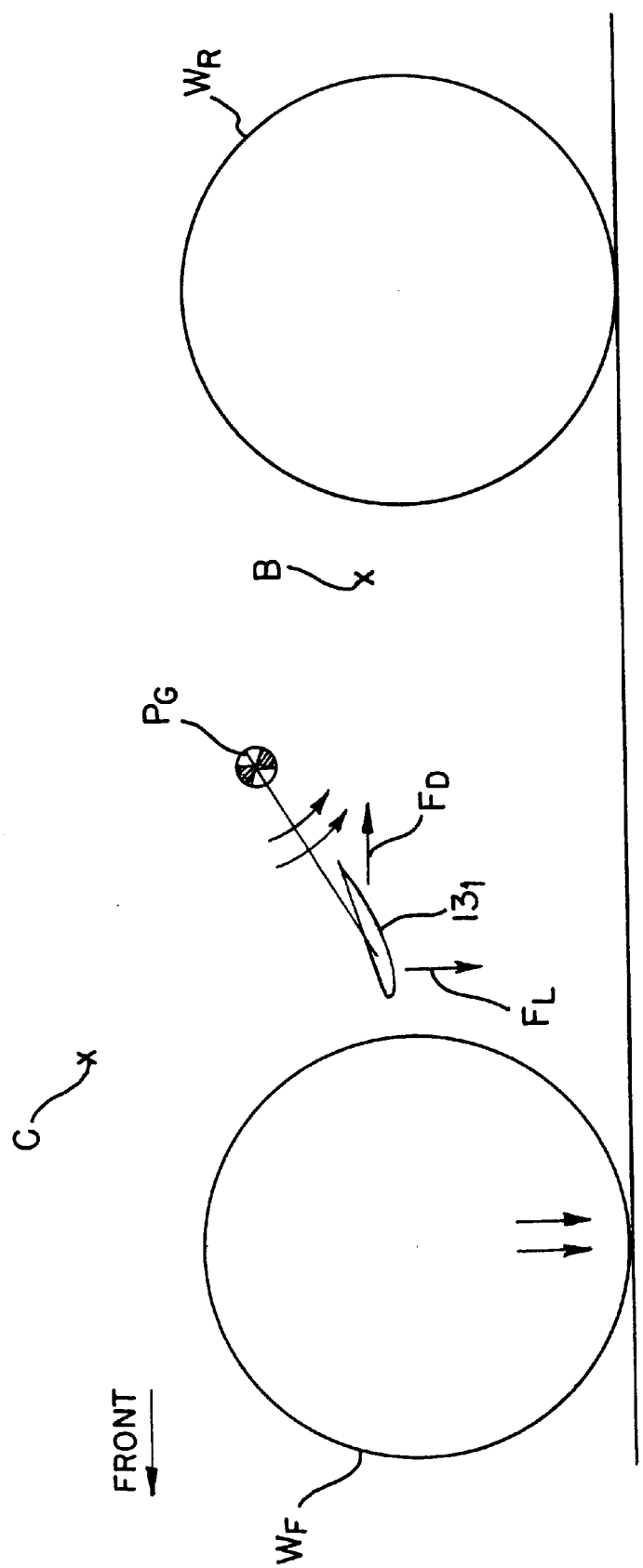
FIG. 4 is a diagram illustrating respective moments around the center of gravity of a vehicle due to lift and drag.

Incidentally, assuming that the wing portion is present at a position C forward and upward from the center of gravity $P_G$ of the vehicle in FIG. 4 as in Japanese Utility Model Laid-open No. Sho 60-57481, the moment around the center of gravity $P_G$ of the vehicle due to down-lift produced by the wing portion acts in the direction of reinforcing the ground pressure of the front wheel $W_F$. However, the moment around the center of gravity $P_G$ of the vehicle due to drag produced by the wing portion acts in the direction of decreasing the ground pressure of the front wheel $W_F$. As a result, the wing portion must be made larger in size to obtain large down-lift for reinforcing the ground pressure of the front wheel $W_F$.

Moreover, assuming that the wing portion is present at a position B rearward and downward from the center of gravity $P_G$ of the vehicle, the moment around the center of gravity $P_G$ of the vehicle due to down-lift produced by the wing portion acts in the direction of decreasing the ground pressure of the front wheel $W_F$ and the moment around the center of gravity $P_G$ of the vehicle due to drag produced by the wing portion acts in the direction of reinforcing the ground pressure of the front wheel $W_F$. However, the effect of reinforcing the ground pressure of the front wheel $W_F$ due to drag is extremely small in consideration of the above-described negative effect of lift.

The cowling 12 in this embodiment is formed in such a shape that the wing portions $13_1$, $13_1$ are disposed forward and downward from the center of gravity $P_G$ of the vehicle in a driver riding state. However, in some cases, the cowling 12 is not formed in such a shape that the wing portions $13_1$, $13_1$ are disposed at the above suitable positions. In this embodiment, however, the wing portions $13_1$, $13_1$ may be disposed at such positions that the aerodynamic centers thereof are positioned forward and downward from the center of gravity $P_G$ of the vehicle.

More specifically, each of the wing portions $13_1$, $13_1$ is permitted to be disposed upward from the center of gravity $P_G$ of the vehicle because it extends obliquely, downward and outward from the side portion of the motorcycle. Further, the wing portion $13_1$ is permitted to be disposed rearward from the center of gravity $P_G$ of the vehicle because it is formed in the sweep forward shape extending obliquely and forward in the running direction of the motorcycle, to thus make larger the degree of freedom in arrangement of the wing portions $13_1$, $13_1$.

Figure 5:
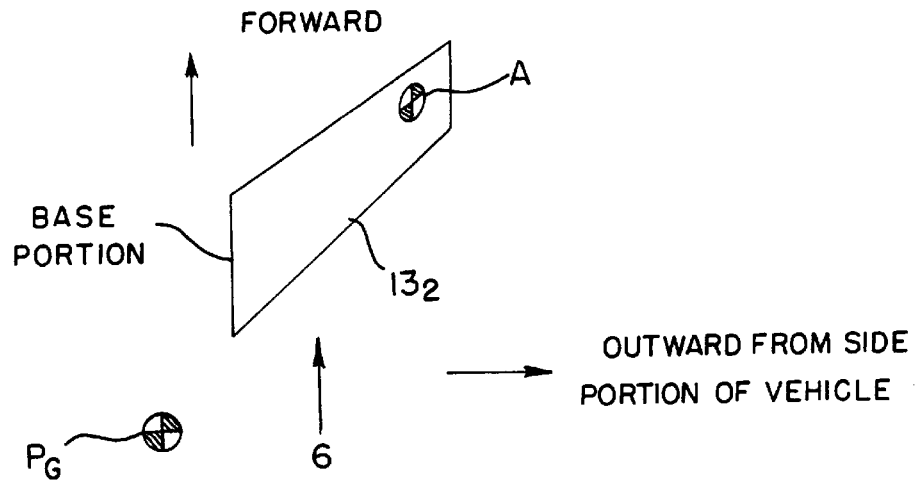
FIG. 5 illustrates a plan view of a modification of the wing portion.
Figure 6:
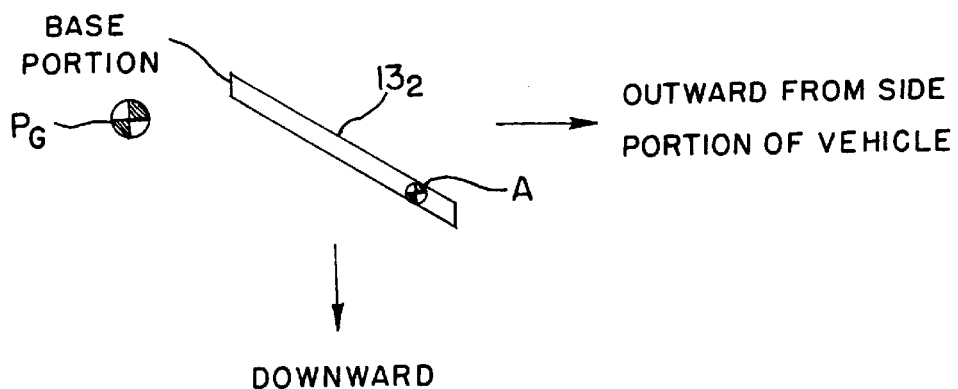
FIG. 6 illustrates a view of the wing portion of FIG. 5 in the direction of arrow 6.

FIGS. 5, 6 show a modification of the wing portion. FIG. 5 is a plan view of the modification of the wing portion. FIG. 6 is a view seen along an arrow 6 of FIG. 5.

The wing portion $13_2$ is formed to have a cross-section which is not streamlined but flat. However, wing portion $13_2$ is formed in a sweep forward wing shape extending obliquely, downward and outward from a side portion of the motorcycle and also extending obliquely and forward in the running direction of the motorcycle.

The flat wing portion $13_2$ can also exhibit the same effect as that in the previous embodiment.

Figure 7:
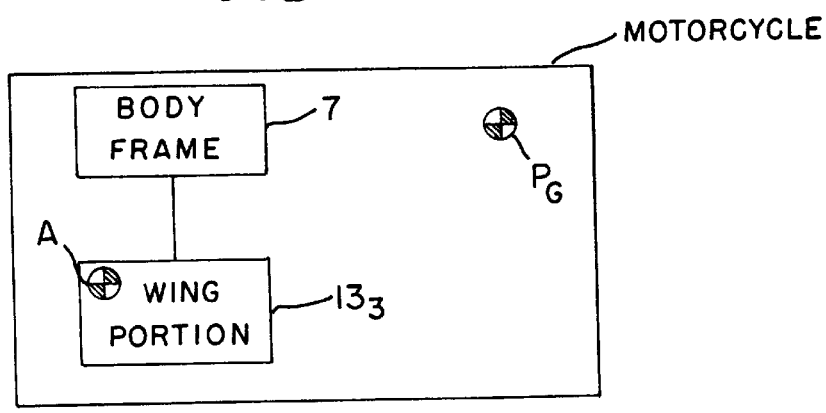
FIG. 7 illustrates in schematic diagram form a motorcycle having a wing portion mounted on a motorcycle frame.

The wing portions are not necessarily limited as disposed on the cowling. For example, wing portions $13_3$, $13_3$ may be provided on the body frame of a motorcycle having no cowling as illustrated in FIG. 7, as long as the aerodynamic centers of the wing portions are positioned forward and downward from the center of gravity of the vehicle in a driver riding state.

As described above, a vehicle such as a motorcycle according to a preferred embodiment of the invention includes wing portions, each of which are disposed such that an aerodynamic center thereof is positioned forward and downward from a center of gravity of the vehicle in driver riding state for producing down-lift. The wing portion can therefore be reduced in size to thereby lower drag acting thereon. The ground pressure of the front wheel may therefore be reinforced to improve steering characteristics.

According to a further embodiment, in addition to the configuration described previously, each of the wing portions are formed in a shape extending obliquely, downward and outward from a side portion of the vehicle, so that the ground pressure of the front wheel can be further reinforced because aerodynamic centers of the wing portions are positioned lower than base portions of the wing portions. Also, the degree of freedom in arrangement of the wing portions can be increased because the wing portions are permitted to be disposed higher than the center of gravity of the vehicle. As illustrated generally in schematic form in FIGS. 5 and 6, base portions of wing portions $13_2$, $13_2$ are located forward of and higher than the center of gravity $P_G$ of the vehicle, while the respective aerodynamic centers A of the wing portions are positioned lower than the center of gravity $P_G$ of the vehicle.

According to a still further embodiment, in addition to the configuration previously described, each of the wing portions is formed in a sweep forward shape extending obliquely and forward in the running direction of the motorcycle, so that the ground pressure of the front wheel can be further reinforced because aerodynamic centers of the wing portions are positioned forward of the base portions of the wing portions. Also, the degree of freedom in arrangement of the wing portions can be increased because the wing portions are permitted to be disposed rearward of the center of gravity of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An apparatus for reinforcing ground pressure of a front wheel of a motorcycle, a center of gravity of the motorcycle being positioned between the front wheel and a rear wheel of the motorcycle, the apparatus comprising:

wing portions, each of which being disposed such that respective aerodynamic centers of said wing portions are positioned downward and forward of the center of gravity of the motorcycle in a forward running direction to produce down-lift, each of said wing portions being formed in a sweep forward wing shape extending obliquely and forward in the forward running direction of the motorcycle and each of said wing portions having forward and rearward edges extending outwardly from the motorcycle airflow impinging over the forward edges of said wing portions.

2. The apparatus for reinforcing ground pressure of a front wheel of a motorcycle of claim 1, wherein each of said wing portions are formed in a shape extending obliquely, downward and outward from respective side portions of the motorcycle.

3. The apparatus for reinforcing ground pressure of a front wheel of a motorcycle of claim 1, wherein respective base portions of each of said wing portions are disposed above the center of gravity of the motorcycle.

4. The apparatus for reinforcing ground pressure of a front wheel of a motorcycle of claim 1, wherein respective base portions of each of said wing portions are disposed below the center of gravity of the motorcycle.

5. The apparatus for reinforcing ground pressure of a front wheel of a motorcycle of claim 1, the front wheel and the rear wheel of the motorcycle being suspended from a frame of the motorcycle, each of said wing portions being mounted on the motorcycle frame.

6. The apparatus for reinforcing ground pressure of a front wheel of a motorcycle of claim 1, the front wheel and the rear wheel being suspended from a frame of the motorcycle, the motorcycle further including a cowling covering a front portion of the motorcycle frame, said wing portions being mounted on the cowling.

7. The apparatus for reinforcing ground pressure of a front wheel of a motorcycle of claim 1, wherein respective first and second wing portions are disposed on opposite first and second sides of the motorcycle.

8. The apparatus for reinforcing ground pressure of a front wheel of a motorcycle of claim 1, wherein each of said wing portions have a streamlined cross-section.

9. The apparatus for reinforcing ground pressure of a front wheel of a motorcycle of claim 1, wherein each of said wing portions have a flat cross-section.

10. A motorcycle comprising:
a frame having a front wheel and a rear wheel suspended therefrom,
a center of gravity of the motorcycle being positioned between said front and rear wheels;
a cowling covering a front portion of said frame; and
wing portions mounted on said cowling, respective aerodynamic centers of said wing portions being positioned downward and forward of the center of gravity of the motorcycle in a forward running direction to produce down-lift and reinforce ground pressure of said front wheel,
said wing portions being formed in a sweep forward shape extending obliquely and forward in the forward running direction of the motorcycle and each of said wing portions having forward and rearward edges extending outwardly from the cowling, airflow impinging over the forward edges of said wing portions.

11. The motorcycle of claim 10, wherein said wing portions extend obliquely, downward and outward from respective side portions of said cowling.

12. The motorcycle of claim 10, wherein respective base portions of said wing portions are mounted above the center of gravity of the motorcycle.

13. The motorcycle of claim 10, wherein respective base portions of said wing portions are mounted below the center of gravity of the motorcycle.

14. The motorcycle of claim 10, wherein said wing portions have a streamlined cross-section.

15. The motorcycle of claim 10, wherein said wing portions have a flat cross-section.

16. A motorcycle comprising:
a frame having a front wheel and a rear wheel suspended therefrom,
a center of gravity of the motorcycle being positioned between said front and rear wheels; and
wing portions mounted on said frame, respective aerodynamic centers of said wing portions being positioned downward and forward of the center of gravity of the motorcycle in a forward running direction to produce down-lift and reinforce ground pressure of said front wheel,
said wing portions being formed in a sweep forward shape extending obliquely and forward in the forward running direction of the motorcycle and each of said wing portions having forward and rearward edges extending outwardly from the frame airflow impinging over the forward edges of said wing portions.

17. The motorcycle of claim 16, wherein said wing portions extend obliquely, downward and outward from respective side portions of said frame.

18. An apparatus for reinforcing ground pressure of a front wheel of a motorcycle, a center of gravity of the motorcycle being positioned between the front wheel and a rear wheel of the motorcycle, the apparatus comprising:
wing portions, each of which being disposed such that respective aerodynamic centers of said wing portions are positioned downward and forward of the center of gravity of the motorcycle in a forward running direction to produce down-lift,
each of said wing portions being formed in a sweep forward wing shape extending obliquely and forward in the forward running direction of the motorcycle and having respective base portions disposed above the center of gravity of the motorcycle.

19. A motorcycle comprising:
a frame having a front wheel and a rear wheel suspended therefrom,
a center of gravity of the motorcycle being positioned between said front and rear wheels;
a cowling covering a front portion of said frame; and
wing portions mounted on said cowling, respective aerodynamic centers of said wing portions being positioned downward and forward of the center of gravity of the motorcycle in a forward running direction to produce down-lift and reinforce ground pressure of said front wheel,
said wing portions being formed in a sweep forward shape extending obliquely and forward in the forward running direction of the motorcycle and having respective base portions mounted above the center of gravity of the motorcycle.

20. A motorcycle comprising:
a frame having a front wheel and a rear wheel suspended therefrom,
a center of gravity of the motorcycle being positioned between said front and rear wheels; and
wing portions mounted on said frame, respective aerodynamic centers of said wing portions being positioned downward and forward of the center of gravity of the motorcycle in a forward running direction to produce down-lift and reinforce ground pressure of said front wheel,
said wing portions being formed in a sweep forward shape extending obliquely and forward in the forward running direction of the motorcycle and having respective base portions mounted above the center of gravity of the motorcycle.

* * * * *